June 29, 1943.  A. VAN DEN BOGAERDE, JR  2,322,897
LEASH STICK
Filed May 31, 1941
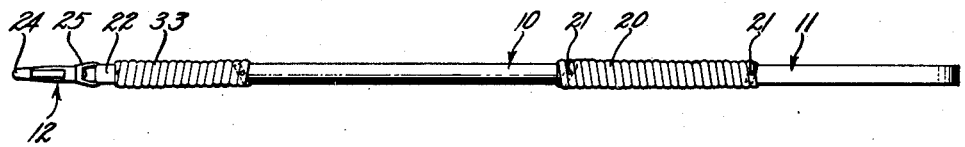
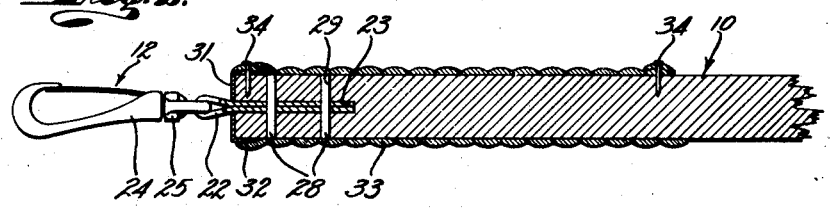
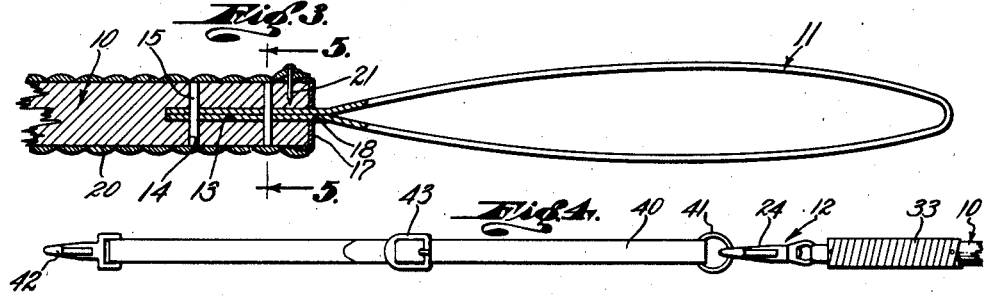
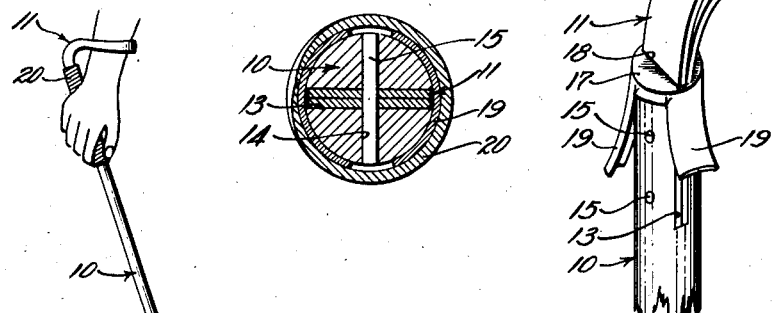
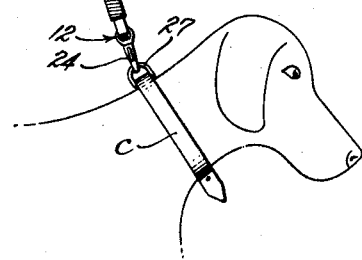
Inventor
ARTHUR VAN DEN BOGAERDE JR.
By
His Attorney Patented June 29, 1943

2,322,897

UNITED STATES PATENT OFFICE 2,322,897

LEASH STICK

Arthur Van den Bogaerde, Jr., Los Angeles, Calif.

Application May 31, 1941, Serial No. 395,910

2 Claims. (Cl. 119—109)

This invention relates to restraining devices and relates more particularly to leash sticks for dogs and other small animals. A general object of this invention is to provide a practical, effective, and improved leash stick.

Another object of the invention is to provide a leash stick embodying a stiff or rigid body that greatly facilitates the close and full control of the dog and that may be employed as a stick to protect the dog against larger dogs, etc. The device of the present invention is characterized by a major portion or body formed of wood, metal or other rigid material and provided at one end with a handle means and at the other end with means for connection with the dog's collar or harness, whereby a person gripping the handle means or the upper portion of the leash body has complete control over the dog and may oblige the dog to remain close to him. Thus the device is particularly useful when the dog is taken on crowded sidewalks, in stores, conveyances, etc. The substantially rigid body of the improved device is also readily available as a whip or weapon to drive other dogs away and to control the owner's dog. When the device of the invention is not in use or is not connected with the dog's collar, harness, or conventional leash, it may be carried as a stick for the control of the owner's dog and as a weapon to drive other dogs away.

Another object of this invention is to provide a leash stick of the character mentioned embodying novel and very dependable means for connecting the handle strap and the buckle means or connection means with the ends of the rigid leash body.

Another object of this invention is to provide a leash stick of the character mentioned embodying a rigid body that is attractive in appearance, light in weight, and yet sufficiently strong to withstand hard usage.

A further object of this invention is to provide a leash stick of the character mentioned that is simple and inexpensive to manufacture.

The various objects and features of my invention will be fully understood from the following detailed description of a typical preferred form and application of the invention, throughout which description reference is made to the accompanying drawing, in which:

Fig. 1 is a side elevation of the device of the present invention. Fig. 2 is an enlarged, fragmentary longitudinal detailed sectional view of an end portion of the device showing the connecting means in side elevation. Fig. 3 is an enlarged fragmentary longitudinal detailed sectional view of the other end portion of the device showing the handle loop in elevation. Fig. 4 is a fragmentary side elevation showing one form of leash strap connected with the device. Fig. 5 is an enlarged transverse detailed sectional view taken as indicated by line 5—5 on Fig. 3. Fig. 6 is a perspective view illustrating one manner in which the leash may be used and Fig. 7 is a fragmentary perspective view illustrating the manner in which the cap members are applied.

The improved leash stick of the present invention may be said to comprise, generally, a substantially rigid body 10, a handle loop 11 secured to one end of the body 10 and coupling means 12 secured to the other end of the body 10 for facilitating the connection of the body with the collar or harness of a dog, cat, or the like.

The body 10 forms the principal element of the leash stick and is an elongate, substantially rigid member. While the length of the body 10 may be varied as found most desirable, it is preferred to make the body of such a length that it may be readily held at its upper end while its lower end is coupled with the collar or harness of the dog at the owner's side, as illustrated in Fig. 6. In accordance with the invention the leash body 10 is formed of rigid substantially unyielding material. The body 10 may be formed of wood, metal, metal alloys, stiff cable, or combinations of such materials, and may be in the form of a solid rod or in the form of a tube. In practice I have found it desirable to form the body 10 of a good grade of bamboo of a type devoid of cells or having longitudinal cells of small diameter or of hard wood such as dowel stock. In the drawing I have illustrated the body 10 formed of dowel stock of the character just mentioned, it being understood that this disclosure is not to be taken as a limitation or restriction. Where the body 10 is formed as illustrated it has a smooth exterior of pleasing appearance and is readily finished. The lesh body 10 is formed and proportioned so that it is substantially rigid or unyielding and has sufficient weight to be employed as a weapon or whip if this becomes necessary.

The handle loop 11 is provided to facilitate the handling of the device, constituting a convenient means for carrying and holding the leash stick. The handle loop 11 may be formed of any selected flexible material. For example, the loop 11 may be formed of leather, rope, fabric, rubber, or combinations of such materials. In the preferred construction illustrated the handle loop 11 may be considered as formed of a leather strap. The loop 11 is secured to the outer or upper end of the leash body 10.

The invention provides novel and very effective means for securing the loop 11 to the body 10. A longitudinal slot 13 is provided in the outer portion of the body 10 and the opposite ends of the loop 11 are arranged in face to face relation and inserted in the slot 13 so that the loop extends from the outer end of the body 10, as illustrated. The slot 13 preferably has flat parallel side walls for engaging or clamping against the sides of the loop 11. Longitudinally spaced transverse openings 14 are provided in the body 10 to intersect the slot 13 and pins or dowels 15 are inserted in the openings 14 to pass through the slot 13 and the portions of the loop 11 in the slot. The ends of the dowels 15 are preferably flush with the surface of the body 10.

A cap member 17 of leather, fabric, rubber, or the like, is provided to cover the outer end of the body 10. The cap member 17 has a slot 18 for receiving the loop 11. The member 17 is slid down the loop 11 to engage against the end of the body 10 and has ears or tabs 19 that are adapted to lie against the outer surface of the body 10. The cap member 17 may be glued or cemented in place. The member 17 arranged as just described completely covers and conceals the end of the body 10.

The means for securing the loop 11 to the body 10 further includes a wrapping 20 of cord, rattan, reed, split bamboo, leather, fabric such as "Fabricoid," or combinations of such materials. The wrapping 20 is helically wound on the upper end portion of the body 10 and extends along a substantial portion of the body 10 to fully cover the slot 13 and the tabs 19. In some cases it may be preferred to apply the wrapping 20 in a wet state so that it shrinks onto the body 10 to tightly grip the body. The wrapping 20 thus shrunk onto the body 10 may compress the split end portion of the body to bring the side walls of the slot 13 into tighter gripping engagement with the portions of the loop 11 received in the slot. The end parts of the wrapping 20 are turned under and may be glued or cemented or may be secured by pins or nails 21 driven into the body 10.

The means 12 is provided on the lower end of the body 10 and serves to releasably connect the leash stick with the dog's collar C or with the harness of the dog. The means 12 may also serve to connect the rigid leash of the invention with a flexible leash of conventional design. In accordance with the broader aspects of the invention the means 12 may be varied considerably. In the construction illustrated the means 12 comprises a strap 22 of leather, fabric, rubber, or combinations of such material. The end portions of the strap 22 are inserted in a longitudinal slot 23 in the end portion of the body 10. If desired the strap 22 may be a single length of material folded upon itself and arranged in the slot 23 to extend from the end of the body. A snap, catch, or clip 24 is carried by the strap 22. The strap 22 is looped to pass through the eye of a swivel 25 of the clip 24. The clip 24 is adapted to be engaged with a ring 27 on the dog collar C or with a similar ring on the dog's harness. In some cases it may be desired to couple the clip 24 with the outer portion of a typical flexible leash so that the rigid leash of the invention is connected with the outer end of the flexible leash. Thus, in Fig. 4 of the drawing, a leash 40 of leather, or the like, is coupled with the clip 24. The leash 40 has a ring 41 removably engaged in the clip 24. The other end of the leash 40 is equipped with a suitable spring clip 42 to be engaged with the dog's collar or harness. The particular leash 40 illustrated is adjustable, being provided intermediate its ends with an adjusting buckle 43. The leash 40 may be coupled with and detached from the clip 24 at will. When the leash 40 is in use it materially lengthens the leash assembly and gives the dog greater freedom.

The means 12 is preferably secured to the body 10 in substantially the same manner as the handle loop 11. Dowels 28 similar to the dowels 15 are arranged through transverse openings 29 in the body 10 to extend through the portions of the strap 22 in the slot 23. The ends of the dowels 28 may be flush with the surface of the body 10. A cap member 31 similar to the member 17 is arranged against the lower end of the body 10 and may be secured to the body by cement, or the like. The member 31 preferably has tabs 32 similar to the tabs 19. A wrapping 33 of rattan, reed, split bamboo, leather, fabric, "Fabricoid," or the like is provided on the lower portion of the body 10. The wrapping 33 is helically wound on the body to cover the sides of the slot 23 and the tabs 32 and, in some cases, may be applied in a wet condition so that it shrinks onto the body to assure the tight secure retention of the strap 22 in the slot 23. The end parts of the wrapping 33 may be turned back or turned under and secured by nails 34 driven into the body 10. The handle loop 11 and the means 12 secured to the body 10 in the manner described above are permanently and securely fixed to the rigid leash body 10.

It is believed that the utility and practicability of the leash stick of this invention will be understood from the foregoing detailed description. In use the clip 24 may be engaged in the ring 27 or in a similar ring on the dog's harness and the handle loop 11 or the upper portion of the body 10, or both, may be grasped to hold the leash. As the leash body 10 is rigid and substantially unyielding the dog may be fully controlled and may be made to remain close to the owner. The flexible strap 22 and the flexible handle loop 11 allow a certain freedom of movement of the dog but the flexible elements are short and are fixed to the rigid body 10 so that the dog's actions may be fully controlled. When the leash is not required it may be disconnected from the collar C or harness and carried as a stick to be readily available for the control of the dog and as a weapon for driving off other dogs. Under some circumstances it may be desired to secure the flexible leash 40 to the dog's collar C or harness and then secure the rigid leash 10 to the outer end of the flexible leash. The improved leash is light in weight and is strong to withstand very hard usage. The wrappings 20 and 33 in the opposite ends of the body 10 complement one another and add to the appearance of the device. The leash is compact and convenient to use.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In a device of the character described, an elongate rigid body, the upper portion of the body having a slot, a handle loop having its end portions in the slot, dowels passing transversely through the body and said portions of the loop to secure the latter in the slot, a cap member covering the upper end of the body, tabs on the member engaging against the side of the body, and a wrapping helically wound on the body to cover the sides of the slot and the tabs to assist in retaining said loop portions in the slot and to hold the tabs against the body.

2. A device of the character described comprising an elongate rigid body having a transverse slot in its end, a looped strap having its end portions received in the slot, means for securing said end portions of the strap in the slot, a cap covering the end of the body and having tabs lying against the side of the body, and a wrapping on the body covering the sides of the slot, holding said tabs against the body to secure the cap to the body and assisting in securing said strap portions in the slot.

ARTHUR VAN DEN BOGAERDE, JR.